(12) United States Patent
Herelier et al.

(10) Patent No.: US 7,108,130 B2
(45) Date of Patent: Sep. 19, 2006

(54) STRIP OF FASTENERS AND LOADER OF SUCH A STRIP FOR EQUIPMENT FOR DRIVING SUCH FASTENERS

(75) Inventors: Patrick Herelier, Tournon (FR); Roland Almeras, Tournon (FR)

(73) Assignee: Societe de Prospection et d'Inventions Techniques SPIT, Bourg-les-Valence (FR)

( * ) Notice: Subject to any disclaimer, the term of this patent is extended or adjusted under 35 U.S.C. 154(b) by 546 days.

(21) Appl. No.: 10/272,294

(22) Filed: Oct. 17, 2002

(65) Prior Publication Data

US 2003/0075466 A1    Apr. 24, 2003

(30) Foreign Application Priority Data

Oct. 18, 2001    (FR) .................................. 01 13452

(51) Int. Cl.
*B65D 85/24* (2006.01)
*B25C 1/00* (2006.01)

(52) U.S. Cl. ...................... 206/338; 206/343; 206/345; 206/346

(58) Field of Classification Search ................ 206/338, 206/343, 345–347, 820; 411/442, 443, 445
See application file for complete search history.

(56) References Cited

U.S. PATENT DOCUMENTS

| | | | |
|---|---|---|---|
| 3,841,474 A * | 10/1974 | Maier ......................... | 206/346 |
| 3,955,674 A | 5/1976 | Maier et al. | |
| 4,684,022 A * | 8/1987 | Potucek ...................... | 206/347 |
| 4,804,088 A * | 2/1989 | MacDonald ................. | 206/346 |
| 4,913,611 A * | 4/1990 | Leistner ...................... | 411/442 |
| 4,971,503 A | 11/1990 | Barnell et al. | |
| 5,096,061 A * | 3/1992 | Wakai ......................... | 206/347 |
| 5,931,298 A * | 8/1999 | Huang ......................... | 206/346 |
| 6,010,291 A * | 1/2000 | Schwingle ................... | 411/442 |
| 6,394,268 B1 * | 5/2002 | Dill et al. .................... | 206/347 |

FOREIGN PATENT DOCUMENTS

| | | | |
|---|---|---|---|
| EP | 0 053 828 A | | 6/1982 |
| EP | 0 502 667 B1 | | 8/1994 |
| JP | 03009107 A | * | 1/1991 |

\* cited by examiner

*Primary Examiner*—Mickey Yu
*Assistant Examiner*—J. Gregory Pickett
(74) *Attorney, Agent, or Firm*—Lowe Hauptman & Berner, LLP

(57) ABSTRACT

A strip includes fasteners (1), each having a shank (2) which is pointed at one end (4) and bears a head (3) at the other end. The fasteners are respectively engaged by their shanks (2) in guide and damping blocks joined together in a string (8). The strip further includes a second guide string (9).

4 Claims, 5 Drawing Sheets

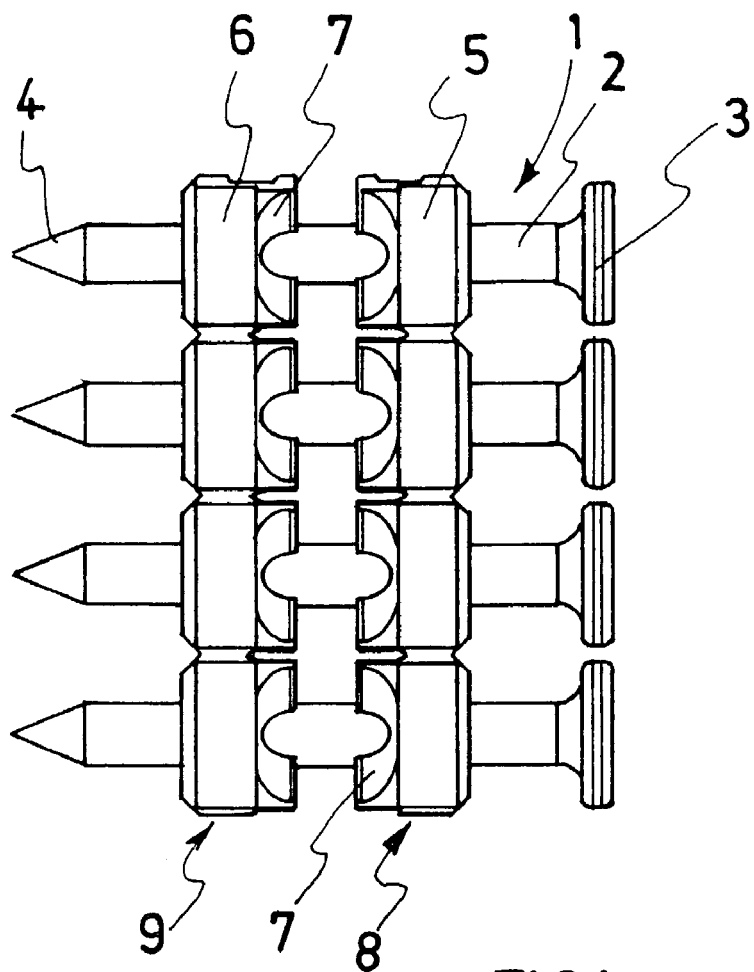
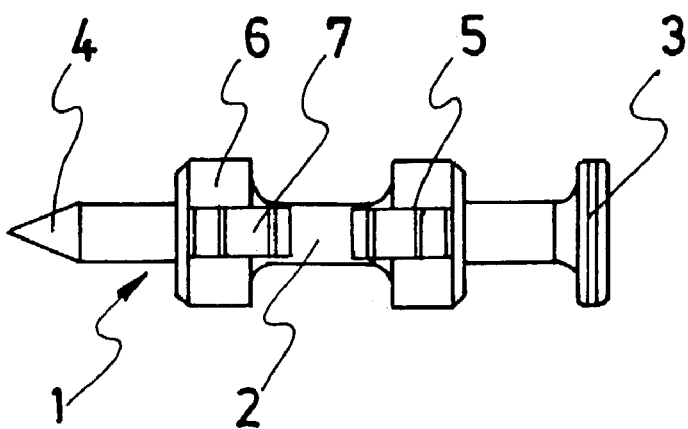

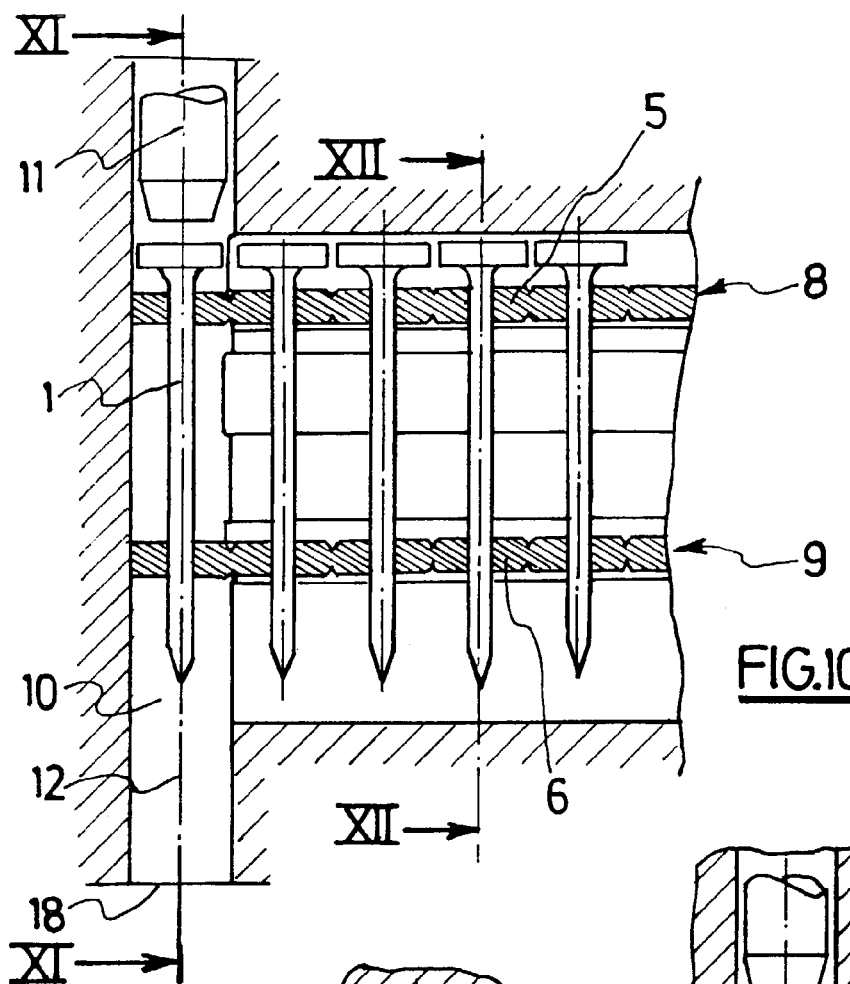
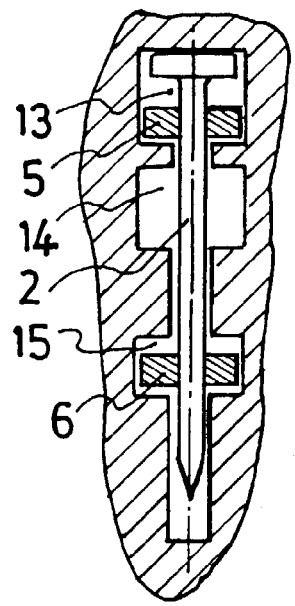
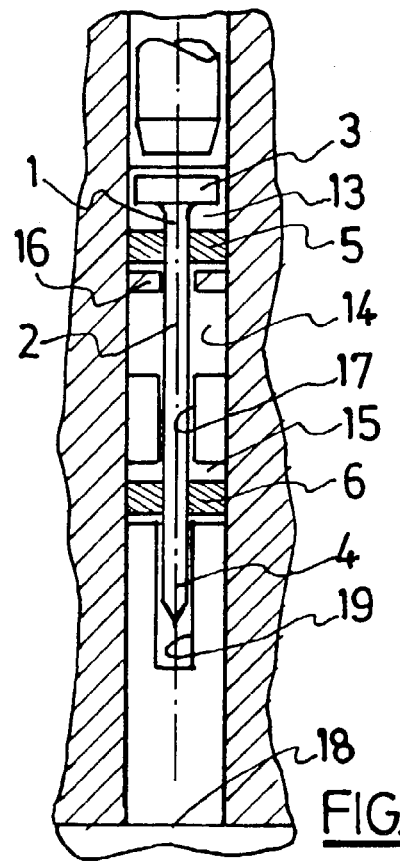

STRIP OF FASTENERS AND LOADER OF SUCH A STRIP FOR EQUIPMENT FOR DRIVING SUCH FASTENERS

TECHNICAL FIELD

The field of the invention is that of the fastening of elements of the nail or wall plug type, comprising a shank with a rear head and a pointed front end.

BACKGROUND OF THE INVENTION

In general, for this purpose use is made of indirectly fired anchoring equipment and a fastener is introduced into the barrel either by hand, from the front, into the plug guide of the equipment, or automatically using a loader.

In order that, as it is being driven along the barrel of the equipment, after firing and before being introduced into the receiving material, the fastener remains perfectly coaxial with the barrel, does not tip with respect to the axis and therefore remains correctly guided, it has already been proposed for a guide washer or guide block to be slipped onto the shank of the fastener. In fact, two guide washers spaced apart along the shank or one guide block of sufficient axial length to ensure good cohesion between the nail and its guide block have already been proposed.

It will be noted that feeding fasteners with guide washers into the barrel of the equipment can be performed only by hand, or, at a pinch, from a dispenser, whereas fasteners with guide blocks can be offered up in strip form with their blocks back to back in a string, the strip being mounted in a loader with a return spring so that when the loader is mounted on the equipment, it pushes the strip and introduces a guide block into the barrel prior to each firing. A string of guide blocks is described, for example, in patent EP 0 502 667.

It will also be noted that with fasteners in strip form, after each firing, the block of the fastener that is to be driven is separated from the adjacent block by shearing by the flyweight of the equipment and then, at the moment that the fastener is driven into the receiving material, the block acts as a damper and as a washer.

SUMMARY OF THE INVENTION

The applicant has noticed that one block was not always enough to ensure correct guidance of the fastener when it is long, and this is why this invention is proposed here thereby.

The invention relates first of all to a strip of fasteners each having a shank which is pointed at one end and bears a head at the other end, these fasteners being respectively engaged by their shanks in guide and damping blocks joined together in a string, characterized in that it has a second guide string.

The second guide string may consist of guide washers joined together like the guide and damping blocks of the first string, but the second string may also consist of guide and damping blocks.

The two strings are not necessarily made of the same material.

In the case of a strip of short fasteners, the two strings may be back to back on the shanks of the fasteners.

In the case of long fasteners, the two strings are advantageously spaced apart along the shanks of the fasteners.

The invention also relates to a loader of a strip of fasteners for equipment for driving such fasteners each having a shank and a head engaged respectively by their shanks in first guide and damping blocks joined together in a first string and in second guide means joined to form a second string, the loader comprising a chamber for accommodating the fastener heads, a chamber for accommodating the first string and a chamber for accommodating the second string, the chambers being connected in pairs by hollow shafts for accommodating the fastener shanks.

Advantageously, the chamber furthest from the chamber for accommodating the shank heads opens into a third hollow shaft that accommodates fastener shank portions for fasteners with long shanks.

As a preference, the chamber for accommodating fastener heads is designed also to accommodate one of the two strings, in the case of fasteners with long shanks guided at two points spaced apart.

As a preference also, there is an intermediate chamber designed to accommodate the two strings in the case of fasteners with short shanks engaged in two strings back to back.

BRIEF DESCRIPTION OF THE DRAWINGS

The invention will be better understood with the aid of the following description of several forms of embodiment of the strip of fasteners and of the strip loader, with reference to the appended drawing, in which FIG. 1 is a plan view of the strip, the long fasteners being engaged in the guide and damping blocks of two strings spaced apart;

FIG. 2 is a profile view of the strip of FIG. 1;

FIG. 10 is a view in section of the loader of the invention, with a strip of long fasteners;

FIG. 11 is a view in section on XI—XI of FIG. 10, and

FIG. 12 is a view in section on XII—XII of FIG. 10.

DETAILED DESCRIPTION OF THE PREFERRED

Figure 3:
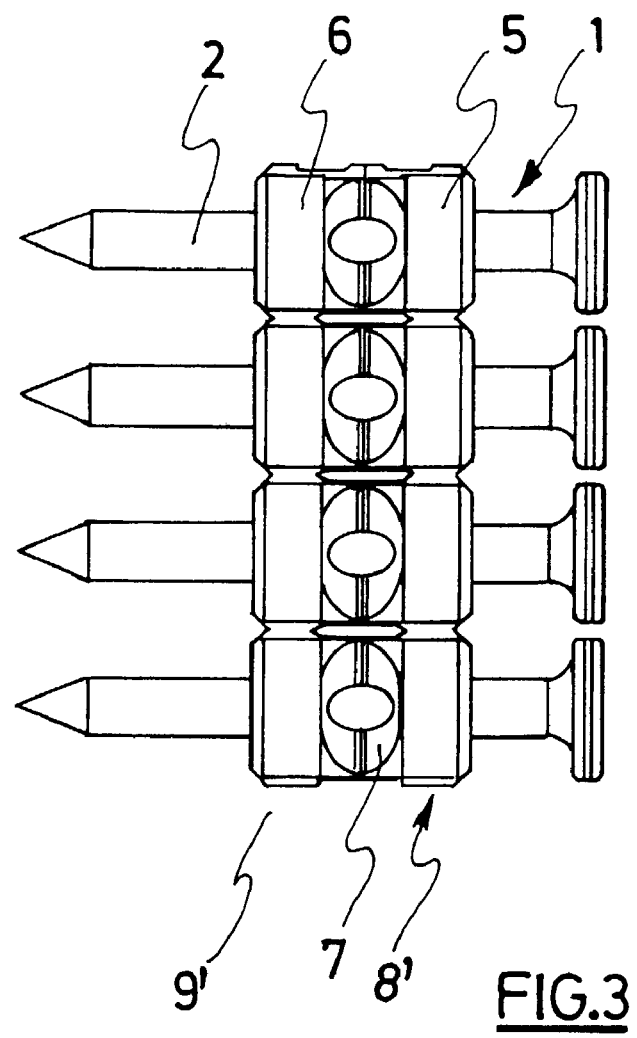
FIG. 3 is a plan view of the strip, similar to that of FIG. 1, but with the two strings back to back.

The strip of fasteners in FIGS. 1 and 2 therefore comprises fasteners 1, with a shank 2, a head 3 and a pointed end 4, each of the fasteners 1 being engaged in two guide and damping blocks 5, 6 with a blow-out portion 7, as described, for example, in EP 0 502 667. The blocks 5, 6 are spaced apart along the shank 2. The blocks 5 closest to the heads 3 are connected to one another in a first string 8, the blocks 6 closest to the pointed ends 4 being connected up to form a second string 9 spaced away from the first one.

Figure 4:
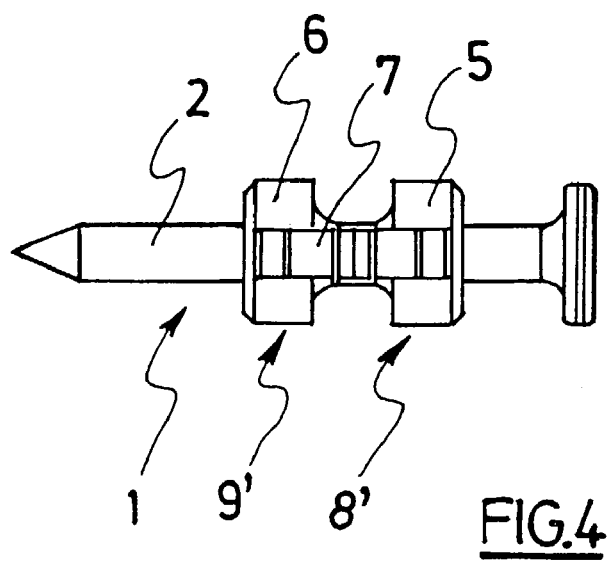
FIG. 4 is a profile view of the strip of FIG. 3.

The strip of fasteners in FIGS. 3 and 4 is practically identical to the previous one. The only difference lies in the fact that the two strings 8', 9' are back to back. These strings are slipped over the same fasteners 1, of the same length, as those in the previous example; however, this arrangement of two back-to-back strings is more suitable to short fasteners.

Figure 5:
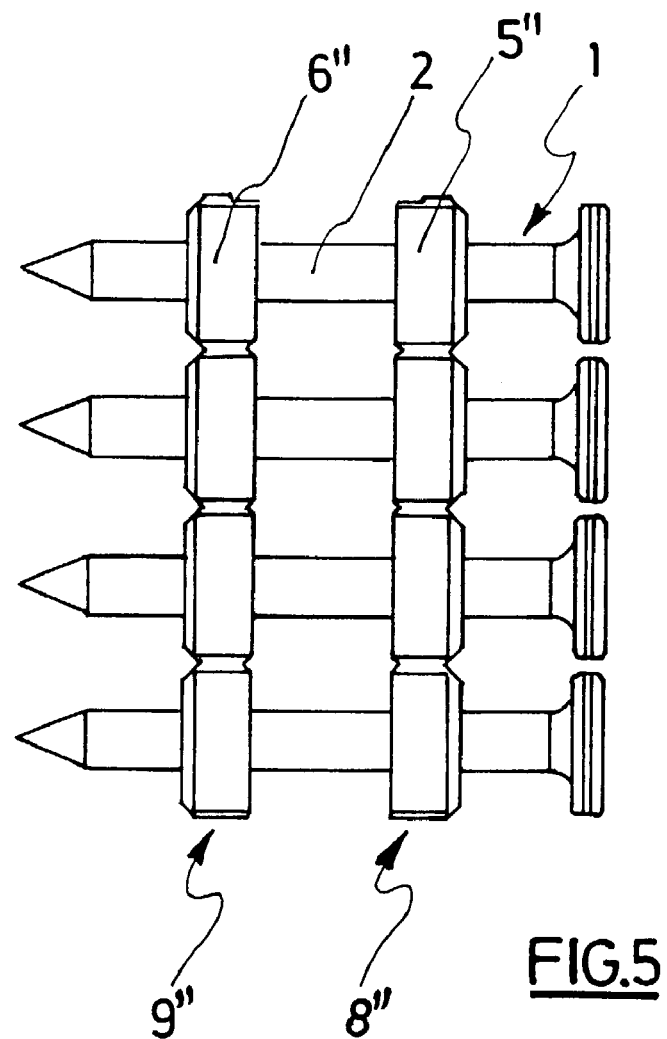
FIG. 5 is a plan view of the strip, similar to that of FIG. 1, the blocks of the two strings being of a simplified form, with guide blocks that have no blow-out portions.
Figure 6:
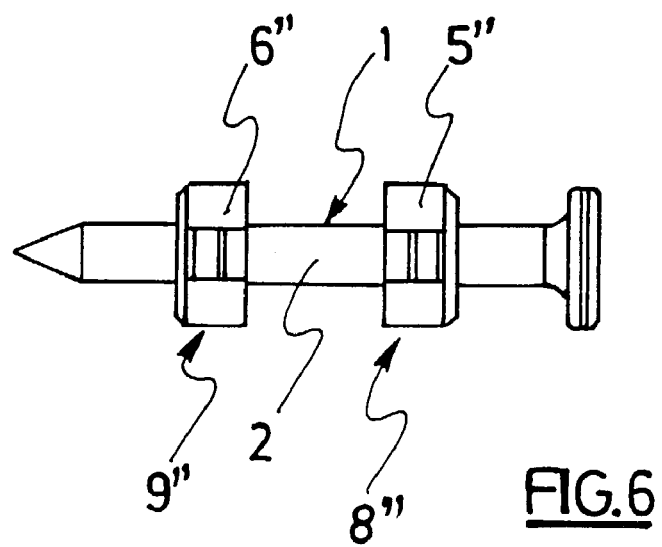
FIG. 6 is a profile view of the strip of FIG. 5.
Figure 7:
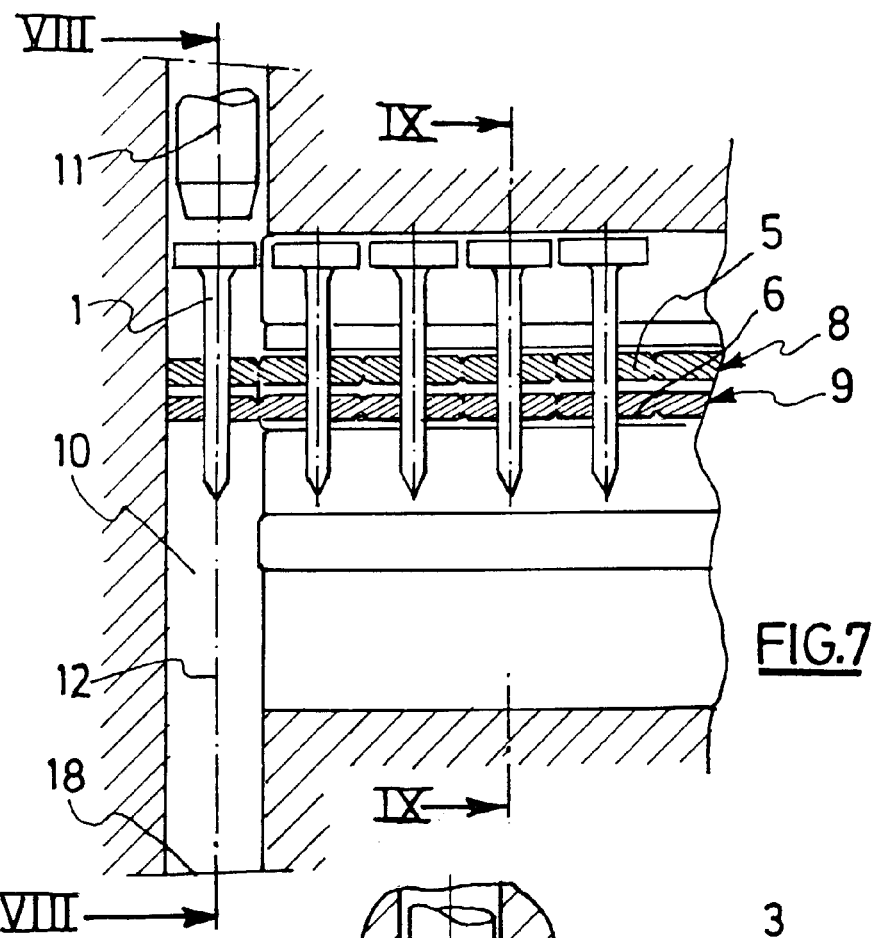
FIG. 7 is a view in section of the loader of the invention, with a strip of short fasteners.
Figure 8:
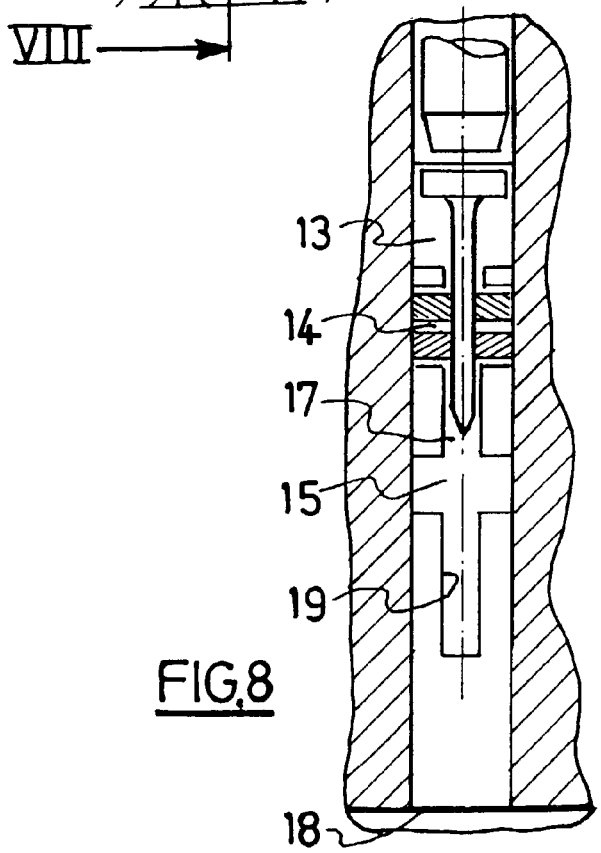
FIG. 8 is a view in section on VIII—VIII of FIG. 7.
Figure 9:
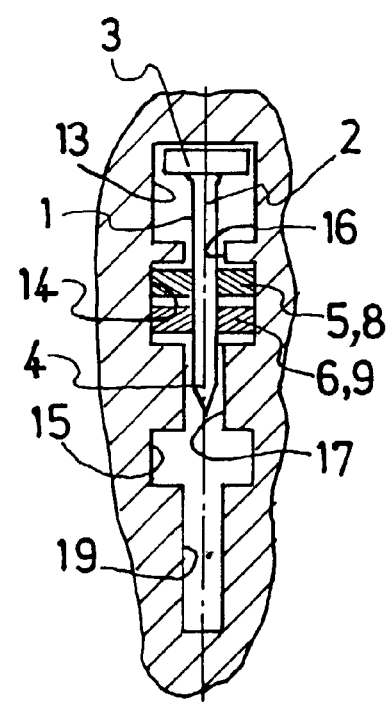
FIG. 9 is a view in section on IX—IX of FIG. 7.

The strip of fasteners in FIGS. 5 and 6 is also practically identical to the previous ones. The only difference compared with the strip in the first FIGS. 1 and 2 lies in the fact that the two strings 8", 9" slipped over the same fasteners 1, are in simplified form, with guide blocks 5", 6" with no blow-out portion.

With reference to FIGS. 7–12, a loader for a strip of fasteners and which can be mounted in the conventional way on equipment for driving and fixing these elements, comprising a barrel 10 in which a fly-weight 11 for driving a fastener 1 is slideably mounted, will now be described. The loader, as far as the automatic advance of the strip of fasteners and therefore the loading of the barrel is concerned, is arranged in the conventional way, with a return spring, not depicted, to push the strip in the direction of the axis 12 of the barrel and introduce a fastener with its two guide blocks, into the barrel.

The loader comprises three parallelepipedal chambers 13, 14 and 15 running longitudinally, that is to say in the direction of travel of the strip through the loader; these three chambers are connected in pairs by two hollow shafts 16, 17 that accommodate shank portions of the fasteners, the accommodating chamber 15 closest to the mouth 18 of the barrel 10 opening into a third hollow shaft 19. The width of the chambers is only very slightly greater than the diameter (or width) of the guide blocks 5, 6, while the width of the hollow shafts is only very slightly greater than the diameter of the shanks 2 of the fasteners 1.

The heads 3 of the fasteners 1 are accommodated in the first chamber 13 furthest from the mouth 18 of the barrel 10. In the case of fasteners with short shanks, such as those in FIGS. 7–9, the guide blocks 5, 6 of the two strings back to back are accommodated in the intermediate chamber 14, the points 4 of the shanks 2 of the fasteners extending into the hollow shaft 17 connecting the intermediate chamber 14 and the third chamber 15 closest to the barrel mouth 18.

In the case of fasteners 1 with long shanks, such as those of FIGS. 10–12, the two strings 8, 9 of guide blocks 5, 6 being spaced apart along the shanks 2 of the fasteners 1, the first string 8 of the blocks 5 closest to the heads 3 is accommodated in the same chamber 13 as the heads 3. The second string 9 of the blocks 6 is accommodated in the third chamber 15, the intermediate second chamber 14 being empty of blocks and having only fastener shank portions 2 passing through it, the ends 4 of which portions extend into the third hollow shaft 19. It will have been noted that it is for reasons of simplicity that the references of the fasteners used in FIGS. 7–9 have been repeated in FIGS. 10–12.

The invention claimed is:

1. A strip of fasteners, comprising:
    a plurality of fasteners each comprising a shank having opposite upper and lower ends, said shank being pointed at the lower end and bearing a head at the opposite, upper end; and
    a first string comprising a plurality of first holding elements connected in series along a longitudinal direction of said strip; and
    a second string comprising a plurality of second holding elements connected in series along the longitudinal direction of said strip;
    wherein
    the shank of each of the fasteners is respectively engaged with one of the first holding elements and one of the second holding elements at first and second locations between the upper and lower ends of said shank, and said one of the first holding elements and said one of the second holding elements are in back to back arrangement; and
    said first and second strings are substantially identical.

2. A strip of fasteners, comprising:
    a plurality of fasteners each comprising a shank having opposite upper and lower ends, said shank being pointed at the lower end and bearing a head at the opposite, upper end; and
    a first string comprising a plurality of first holding elements connected in series along a longitudinal direction of said strip; and
    a second string comprising a plurality of second holding elements connected in series along the longitudinal direction of said strip;
    wherein
    the shank of each of the fasteners is respectively engaged with one of the first holding elements and one of the second holding elements at first and second locations between the upper and lower ends of said shank, and said one of the first holding elements and said one of the second holding elements are in back to back arrangement;
    each of the first and second holding elements that engage with the shank of each of the fasteners comprises an upper portion and a lower portion;
    the upper portion of the first holding element has a radial extent greater than that of the lower portion of said first holding element; and
    the upper portion of the second holding element has a radial extent smaller than that of the lower portion of said second holding element.

3. The strip of claim 2, wherein the first holding element is located, on said shank, above the second holding element.

4. The strip of claim 3, wherein the first and second holding elements are substantially identical.

* * * * *